United States Patent [19]

Nelson et al.

[11] Patent Number: 5,569,053
[45] Date of Patent: Oct. 29, 1996

[54] CONNECTOR FOR CONNECTING AN ELECTRONIC DEVICE TO A VEHICLE ELECTRICAL SYSTEM

[75] Inventors: Robert N. Nelson; Chad N. Nelson, both of Scottsdale, Ariz.

[73] Assignee: Andrew Corporation, Orland Park, Ill.

[21] Appl. No.: 303,168

[22] Filed: Sep. 8, 1994

[51] Int. Cl.⁶ .................................................. H01R 17/18
[52] U.S. Cl. ........................................ 439/668; 439/638
[58] Field of Search .................................. 439/638, 667, 439/668, 669

[56] References Cited

U.S. PATENT DOCUMENTS

| | | | |
|---|---|---|---|
| 4,248,494 | 2/1981 | McDonald et al. | 439/668 |
| 4,322,122 | 3/1982 | Schwartz et al. | 439/668 |
| 5,131,869 | 7/1992 | Wharton | 439/669 |
| 5,201,677 | 4/1993 | Takayama | 439/638 |
| 5,261,838 | 11/1993 | Fujie | 439/668 |
| 5,263,879 | 11/1993 | Sasa et al. | 439/668 |
| 5,387,136 | 2/1995 | Britton | 439/638 |

FOREIGN PATENT DOCUMENTS

| 49306 | 6/1993 | Japan | 439/638 |
|---|---|---|---|

Primary Examiner—David L. Pirlot
Assistant Examiner—Barry Matthew L. Standig
Attorney, Agent, or Firm—Arnold, White & Durkee

[57] ABSTRACT

A connector for connecting an electronic device to a vehicle electrical system comprises a hollow inner sleeve, a hollow outer sleeve, and first and second conductive contacts. The inner sleeve forms a hollow nozzle located at a distal end of the inner sleeve and opening into the interior of the inner sleeve. The first conductive contact is slidably mounted within the nozzle and is movable between an extended position and a depressed position. In the extended position the first contact protrudes from the nozzle, while in the depressed position the first contact is substantially disposed within the nozzle. The first contact is spring-biased toward the extended position. The second contact is mounted to a sidewall of the inner sleeve. The outer sleeve is slidably mounted over the inner sleeve and is movable between a forward position and a retracted position. The outer sleeve forms at least one locking finger at a distal end thereof and circumferentially located away from the second contact. The inner sleeve forms a ramp for laterally displacing the locking finger outward in response to movement of the outer sleeve from the retracted position to the forward position.

13 Claims, 6 Drawing Sheets

CONNECTOR FOR CONNECTING AN ELECTRONIC DEVICE TO A VEHICLE ELECTRICAL SYSTEM

FIELD OF THE INVENTION

The present invention relates generally to electrical connectors and, more particularly, relates to a connector for connecting an electronic device to a vehicle electrical system. Various types of electronic devices may be connected to the vehicle electrical system, including rechargeable batteries, communications equipment, audio equipment, video equipment, radar detectors, vehicle cleaning equipment, etc.

BACKGROUND OF THE INVENTION

The vehicle electrical system includes a power input terminal typically in the form of a cigarette lighter socket. To attach an electronic device to the vehicle electrical system, a connector attached to the electronic device via an electrical cord is inserted into the cigarette lighter socket. Vehicles manufactured in different countries have cigarette lighter sockets with different diameters. A drawback of existing connectors is that they are not capable of accommodating cigarette lighter sockets with different diameters. While an existing connector may securely fit into a cigarette lighter socket of one diameter, the connector will not securely fit into a cigarette lighter socket of a relatively large diameter. As a result, movement of the electronic device attached to the connector may tug on the connector so as to dislodge the connector from the relatively large socket, thereby disconnecting the electronic device from its power source.

SUMMARY OF THE INVENTION

A primary object of the present invention is to provide such a connector which is capable of securely fitting in cigarette lighter sockets having a range of diameters.

Other objects and advantages of the invention will be apparent from the following detailed description and the accompanying drawings.

In one particular embodiment, the foregoing objects are realized by providing a connector for connecting an electronic device to a vehicle electrical system. The connector includes a hollow inner sleeve, a hollow outer sleeve, and first and second conductive contacts. The inner sleeve forms a hollow nozzle located at a distal end of the inner sleeve and opening into the interior of the inner sleeve. The first conductive contact is slidably mounted within the nozzle and is movable between an extended position and a depressed position. In the extended position the first contact protrudes from the nozzle, while in the depressed position the first contact is substantially disposed within the nozzle. The first contact is spring-biased toward the extended position. The second contact is mounted to a sidewall of the inner sleeve. The outer sleeve is slidably mounted over the inner sleeve and is movable between a forward position and a retracted position. The outer sleeve forms at least one locking finger at a distal end thereof and circumferentially located away from the second contact. The inner sleeve forms a ramp for laterally displacing the locking finger outward in response to movement of the outer sleeve from the retracted position to the forward position.

BRIEF DESCRIPTION OF THE DRAWINGS

FIG. 2 is an exploded perspective view of the connector in FIG. 1a;

Figure 1A:
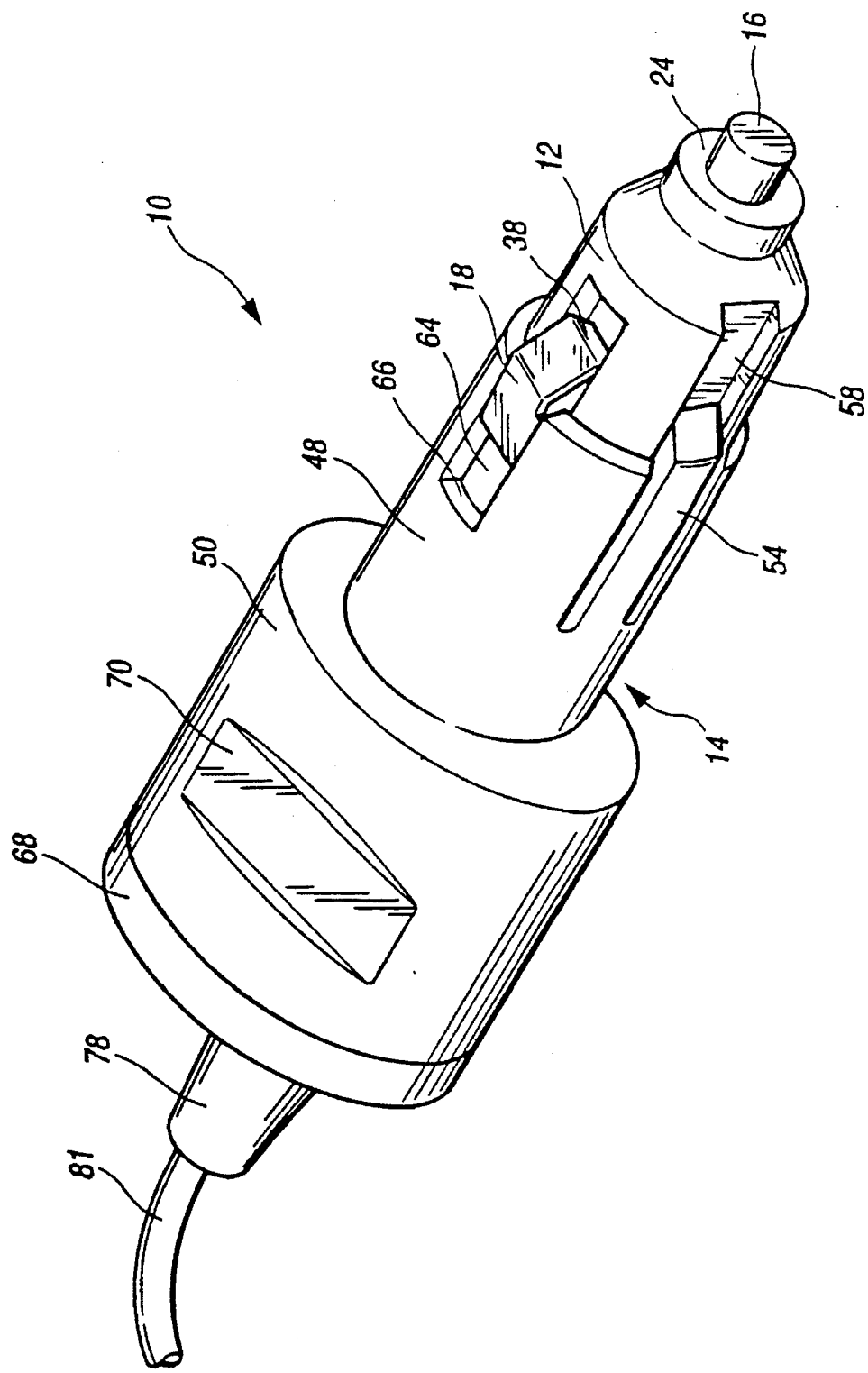
FIG. 1a is a perspective view of a connector embodying the present invention.

While the invention is susceptible to various modifications and alternative forms, a specific embodiment thereof has been shown by way of example in the drawings and will be described in detail. It should be understood, however, that it is not intended to limit the invention to the particular form described, but, on the contrary, the intention is to cover all modifications, equivalents, and alternatives falling within the spirit and scope of the invention as defined by the appended claims.

DETAILED DESCRIPTION OF THE PREFERRED EMBODIMENT

Figure 1B:
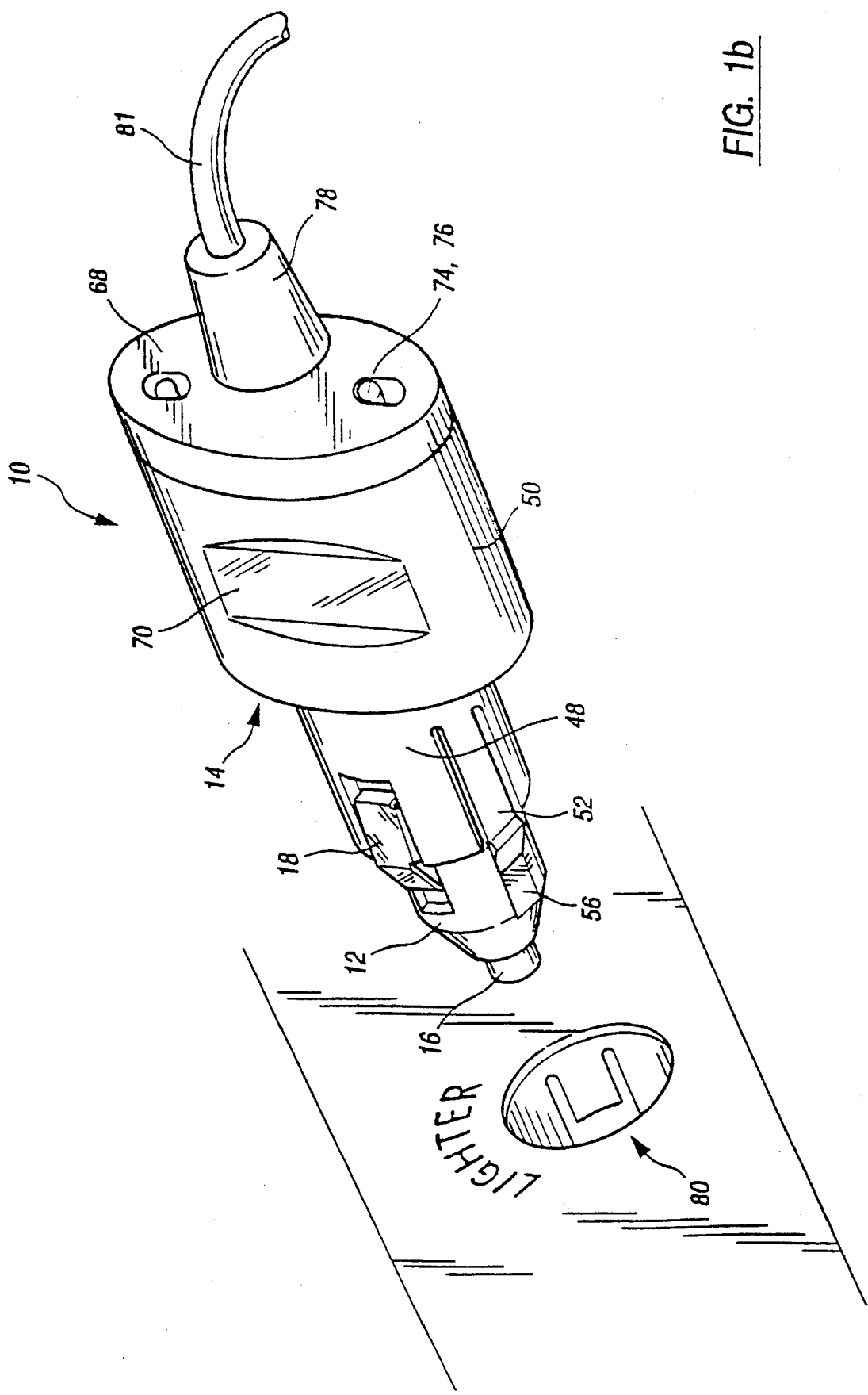
FIG. 1b is another perspective view of the connector in FIG. 1a showing insertion of the connector into a cigarette lighter socket.
Figure 2:
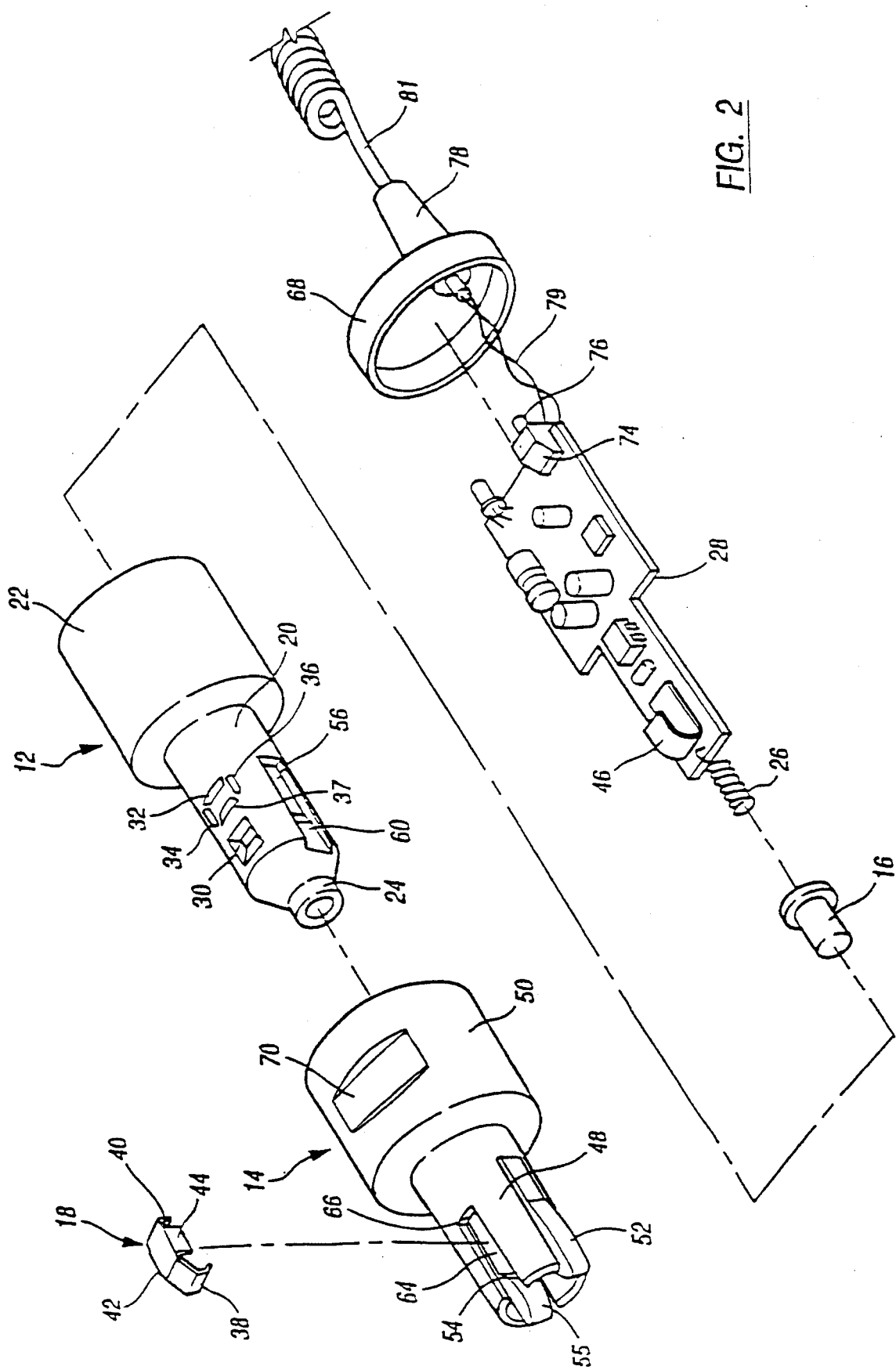

Turning now to the drawings, FIGS. 1a–b and 2 illustrate a connector 10 for connecting an electronic device to a vehicle electrical system. The connector 10 includes a hollow inner sleeve 12, a hollow outer sleeve 14, a positive electrical contact 16, and an external negative electrical contact 18. The inner sleeve 12 includes a generally cylindrical distal portion 20 and a generally elliptical proximal portion 22 (FIG. 2). The cylindrical portion 20 forms a hollow nozzle 24 located at the distal end thereof and opening into the interior of the inner sleeve 12.

The positive electrical contact 16 is configured in a cylindrical shape and is slidably mounted within the nozzle 24 of the inner sleeve 12. The positive contact 16 is movable between an extended position (FIG. 3) and a depressed position (FIGS. 4 and 5). In the extended position (FIG. 3) the positive contact 16 protrudes outwardly from the nozzle 24, while in the depressed position (FIGS. 4 and 5) the positive contact 16 is concealed within the nozzle 24. A compression spring 26 biases the positive contact 16 toward the extended position. One end of the compression spring 26 is received within a cylindrical cavity formed by the hollow positive contact 16, and this end of the compression spring 26 bears against the inner surface of the distal transverse wall of the positive contact 16. The other end of the compression spring 26 is attached to a printed circuit board 28 securely mounted within the inner sleeve 12 (FIGS. 2–5). The positive contact 16 is conductively coupled to the circuitry formed on the printed circuit board 28 via the compression spring 26. In one preferred embodiment, the printed circuit board 28 has formed therein battery charging circuitry for charging a portable rechargeable battery from the vehicle electrical system (see FIG. 2). It should be understood, however, that the connector 10 may be configured for use with electronic devices other than a rechargeable battery.

The external negative contact 18 is securely mounted to the cylindrical portion 20 of the inner sleeve 12. More specifically, the inner sleeve 12 forms a plurality of retaining slots 30, 32, 34, and 36 engaging respective portions 38, 40, 42, and 44 of the negative contact 18 (FIG. 2). The distal contact portion 38 includes a first transverse section extending downward through the slot 30 in the inner sleeve 12, a longitudinal section positioned adjacent to an inner surface of the inner sleeve 12, and a second transverse section extending upward through another retaining slot 37. The portions 42, 44 are anchored in the respective longitudinal slots 34, 36, while the proximal contact portion 40 is anchored in the slot 32. To electrically connect the external negative contact 18 to the printed circuit board 28, the longitudinal section of the distal contact portion 38 abuts a U-shaped negative contact 46 mounted to the printed circuit board 28 (FIGS. 2–5).

The outer sleeve 14 is slidably mounted over the coaxial inner sleeve 12. Like the inner sleeve 12, the outer sleeve 14 includes a generally cylindrical distal portion 48 and a generally elliptical proximal portion 50. The outer sleeve 14 is longitudinally movable between a retracted position (FIGS. 3 and 4) and a forward position (FIG. 5). The cylindrical portion 48 of the outer sleeve 14 forms a pair of flexible locking fingers 52, 54 at a distal end thereof and extending in the longitudinal direction. The locking fingers 52, 54 have respective broad tips 53, 55, and the locking fingers 52, 54 are circumferentially spaced away from the external negative contact 18. In the preferred embodiment, the locking fingers 52, 54 are circumferentially spaced approximately 90 degrees away from each other, and each locking finger is circumferentially spaced approximately 135 degrees away from the negative contact 18.

The cylindrical portion 20 of the inner sleeve 12 forms a pair of guide slots 56, 58 for accommodating the broad tips 53, 55 of the respective locking fingers 52, 54 (FIGS. 2–5). Proximal portions of the slots 56, 58 open into the interior of the inner sleeve 12 so as to form apertures in the outer sleeve 14. When the outer sleeve 14 is in the retracted position (FIGS. 3 and 4), the broad tips 53, 55 of the respective locking fingers 52, 54 protrude through the proximal portions of the slots 56, 58 into the interior of the inner sleeve 12. The distal portions of the slots 56, 58 do not open into the interior of the inner sleeve 12, but rather include respective bottom surfaces formed by the outer surface of the inner sleeve 12. These bottom surfaces form respective ramps 60, 62 for laterally displacing the respective locking fingers 52, 54 outward in response to longitudinal movement of the outer sleeve 14 from the retracted position (FIGS. 3 and 4) to the forward position (FIG. 5).

In particular, as the outer sleeve 14 is longitudinally moved from the retracted position to the forward position, the locking finger tips 53, 55 contact the ramps 60, 62 which, in turn, laterally displace the tips 53, 55 (and the remainder of the flexible locking fingers 52, 54) in a radially outward direction (FIG. 5). Continued longitudinal movement of the outer sleeve 14 in a forward direction causes further lateral displacement of the locking fingers 52, 54 in the radially outward direction. The frictional fit between the inner and outer sleeves 12, 14 is sufficient to prevent the outer sleeve 14 from "slipping" rearward (in the proximal direction) as the locking fingers 52, 54 engage the ramps 60, 62.

To enable a user to more easily hold the connector 10 to insert it into a cigarette lighter socket and dislodge it from the socket, the elliptical portion 50 of the outer sleeve 14 includes a pair of opposing finger gripping areas 70, 72. The user typically touches one of the gripping areas 70, 72 with his/her thumb and the other of the gripping areas 70, 72 with his/her forefinger and/or middle finger. To accommodate the external negative contact 18 mounted to the inner sleeve 12 as the outer sleeve 14 is moved toward the forward position, the cylindrical portion 48 of the outer sleeve 14 is provided with an elongated opening 64 extending proximally from the distal end of the outer sleeve 14. The opening 64 is slightly wider than the width of the negative contact 18 (FIGS. 1a–b).

The longitudinal range of forward movement of the outer sleeve 14 relative to the inner sleeve 12 is limited by the external negative contact 18. In the extreme forward position of the outer sleeve 14, a stop 66 strikes the negative contact 18. To limit longitudinal movement of the outer sleeve 14 in the rearward (proximal) direction, the connector 10 is provided with an elliptically-shaped endcap 68 which snaps over the proximal end of the inner sleeve 12. When the outer sleeve 14 is in the extreme retracted position (FIGS. 3 and 4), the proximal end of the outer sleeve 14 strikes the endcap 64.

The connector 10 includes several features which redundantly prevent the outer sleeve 14 from rotating relative to the inner sleeve 12. For example, the locking finger tips 53 are retained in the respective slots 56, 58. Also, the negative contact 18 protrudes through the elongated opening 64 formed in the outer sleeve 14. Moreover, the elliptical portion 50 of the outer sleeve 14 is mounted over the elliptical portion 22 of the inner sleeve 12. Each of the foregoing features by themselves is sufficient to fix the rotational position of the outer sleeve 14 relative to the inner sleeve 12.

As stated above, the printed circuit board 28 is securely mounted within the inner sleeve 12. More specifically, the inner surface of the inner sleeve 12 forms guide grooves (not shown) for retaining the opposing longitudinal edges of the printed circuit board 28. These grooves fix the rotational position of the printed circuit board 28. The printed circuit board 28 extends substantially through the inner sleeve 12, and the width of the printed circuit board 28 conforms to the inner surface of the inner sleeve 12. For example, at the junction between the cylindrical portion 20 and the elliptical portion 22 of the inner sleeve 12, the inner dimension of the inner sleeve 12 abruptly changes. As best shown in FIG. 2, the printed circuit board 28 is formed with a corresponding change in width. If the printed circuit board 28 has battery charging circuitry formed thereon, the connector 10 may be provided with a switch 74 for activating the battery charging circuitry (FIGS. 2–5). The switch 74 is clipped to the printed circuit board 28, and the switch 74 includes a lever 76 for operating the switch 74 so as to turn the battery charging circuitry on and off.

To connect the connector 10 to an electronic device, conductors 79 (FIG. 2) in an electrical cord 81 are electrically connected to the printed circuit board 28 at one end and are electrically connected to the electronic device at the other end. The electrical cord 81 enters the connector 10 via an aperture formed in the endcap 68. To protect the electrical connection between the conductors 79 and the printed circuit board 28, a conventional strain relief 78 grips the electrical cord 81 and fixes the position of the electrical cord 81 at the point of entry into the connector 10. The strain relief 78 minimizes the stress and strain applied to the conductors in the electrical cord as a result of movement of the connector 10 relative to the electronic device.

FIG. 2 is an exploded perspective view of the connector 10. To assemble the connector 10, the positive contact 16 is first placed over the compression spring 26, which is soldered to the printed circuit board 28. Next, the printed circuit board 28 is telescoped into the inner sleeve 12 via the proximal end thereof so that the positive contact 16 protrudes from the nozzle 24 of the inner sleeve 12. The printed circuit board 28 is rotationally oriented relative to the inner sleeve 12 such that the opposing longitudinal edges of the printed circuit board 28 are situated in the guide grooves formed in the inner surface of the inner sleeve 12. After the printed circuit board 28 is mounted within the inner sleeve 12, the endcap 68 (with the strain relief 78 attached thereto) is snapped over the proximal end of the inner sleeve 12. The inner sleeve 12 is then telescoped into the outer sleeve 14 via the proximal end thereof. The inner sleeve 12 is rotationally oriented relative to the outer sleeve 14 such that (1) the locking fingers 52, 54 are positioned within the respective slots 56, 58 and (2) the elongated opening 64 exposes the retaining slots 30, 32, 34, 36, and 37. Finally, the external negative contact 18 is mounted to the inner sleeve 12 by inserting the portions 38, 40, 42, and 44 of the negative contact 18 into their corresponding retaining slots.

The principal components of the connector 10 are manufactured as follows. The inner sleeve 12, the outer sleeve 14, and the endcap 68 are each composed of an insulative plastic, such as a polycarbonate (ABS blend), and are preferably manufactured by conventional high-pressure injection molding techniques. The positive and negative contacts 16, 18 are composed of a conductive material such as steel, brass, bronze, or other suitable material. The positive contact 16 is preferably manufactured by conventional impact extrusion techniques, while the negative contact 18 is preferably manufactured by conventional progressive dye/four slide techniques.

Figure 3:
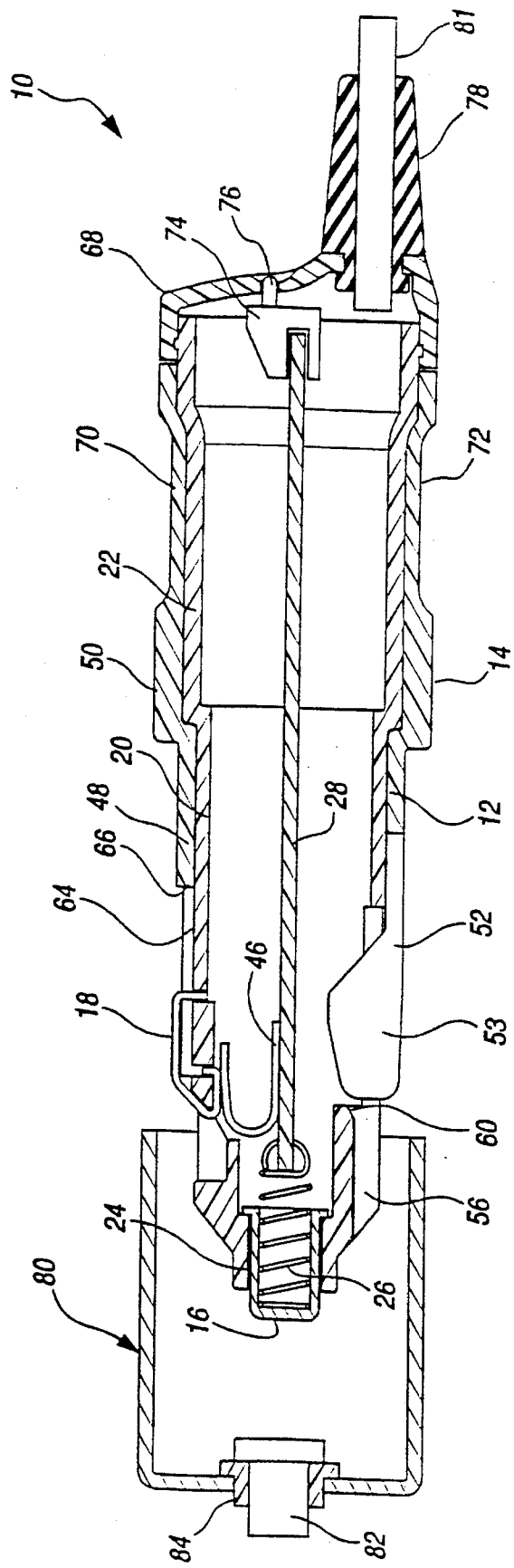
FIG. 3 is a longitudinal section of the connector in FIG. 1a showing the connector partially inserted into a cigarette lighter socket, showing a positive contact of the connector in an extended position, and showing an outer sleeve of the connector in a retracted position.
Figure 4:
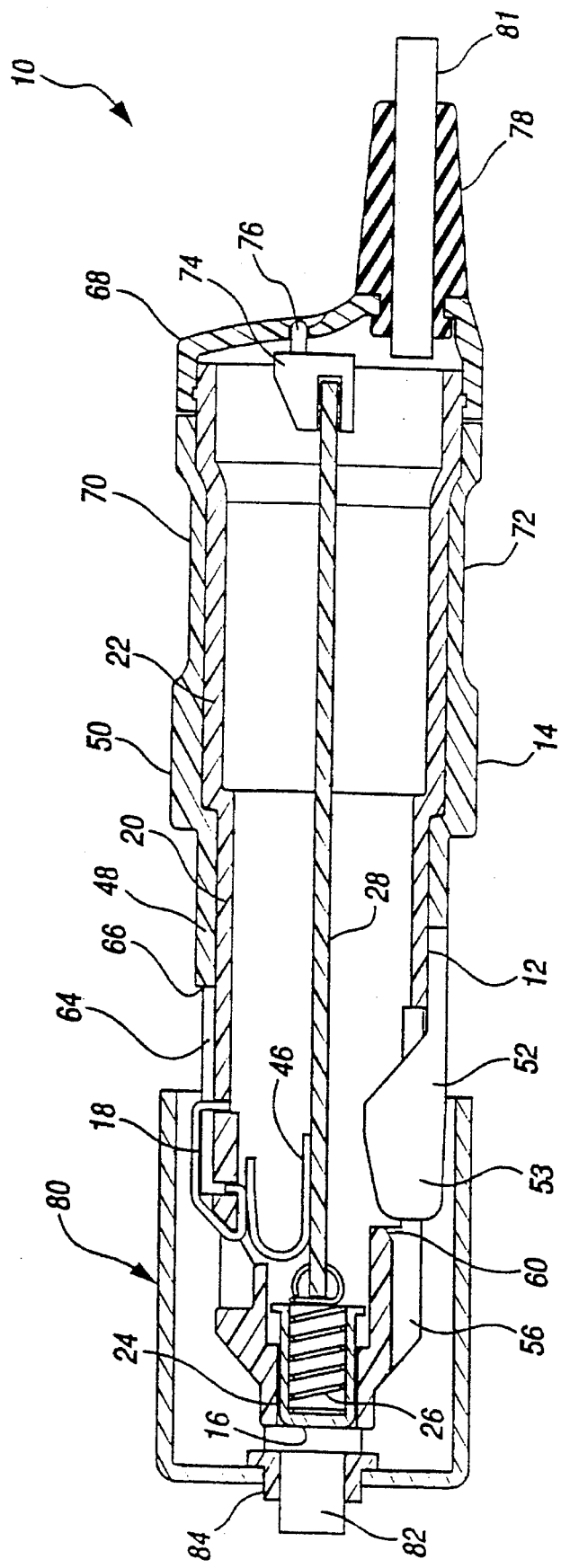
FIG. 4 is a longitudinal section of the connector in FIG. 1a showing the connector fully inserted into the cigarette lighter socket, showing the positive contact of the connector in a depressed position, and showing the outer sleeve of the connector in the retracted position.
Figure 5:
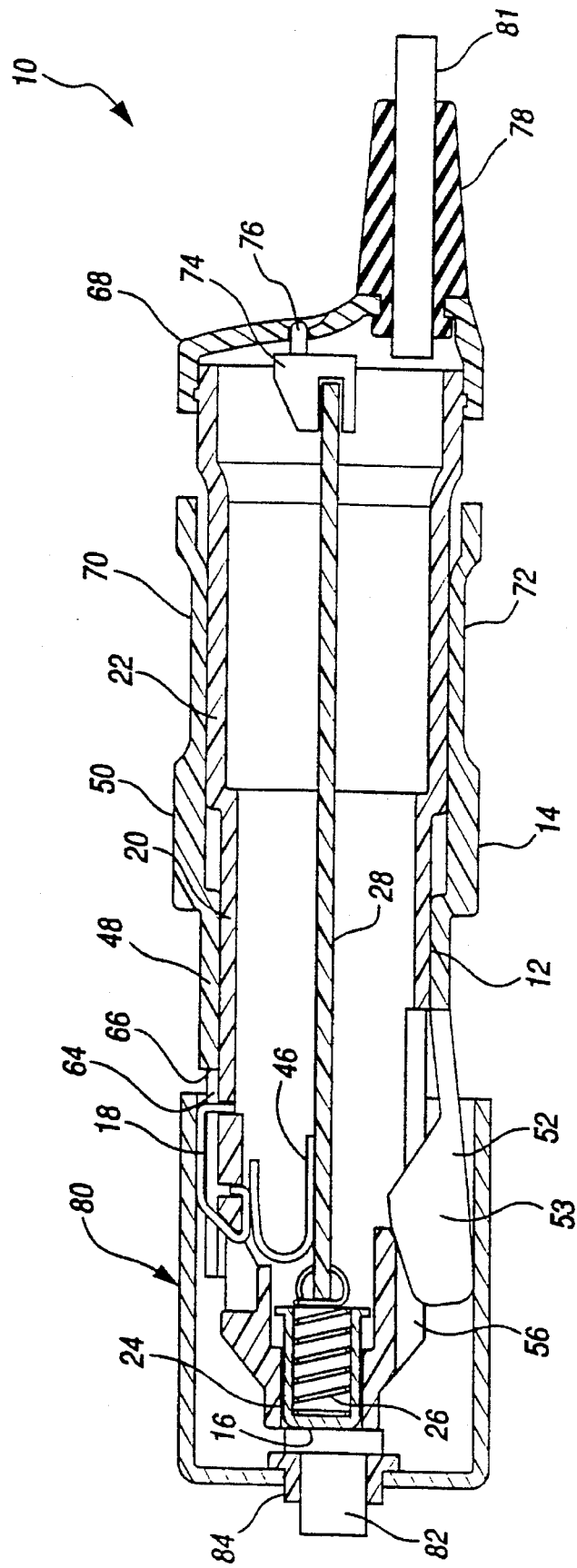
FIG. 5 is a longitudinal section of the connector in FIG. 1a showing the connector fully inserted into the cigarette lighter socket, showing the positive contact of the connector in the depressed position, and showing the outer sleeve of the connector in a forward position.

FIGS. 3–5 illustrate insertion of the connector 10 into a cigarette lighter socket 80 of a vehicle so as to connect an electronic device to the vehicle electrical system. To insert the connector 10 into the cigarette lighter socket 80, a user grips the gripping areas 70, 72 formed in the elliptical portion 50 of the outer sleeve 14 and introduces the connector 10 into the socket 80 as shown in FIG. 3. When the connector 10 is only partially inserted into the cigarette lighter socket 80 (FIG. 3), the positive contact 16 is biased by the compression spring 26 to the extended position and the outer sleeve 14 is in the retracted position. As the user advances the connector 10 into the socket 80, the positive contact 16 strikes an associated positive input terminal 82 mounted in the rear wall of the socket 80. Continued advancement of the connector 10 into the socket 80 depresses the positive contact 16, as illustrated in FIG. 4. Once the positive contact 16 is fully depressed (FIG. 4), the continued application of insertion force to the connector 10 causes the outer sleeve 14 to longitudinally slide over the inner sleeve 12 in the direction of the socket 80. As the outer sleeve 14 longitudinally slides over the inner sleeve 12, the locking fingers 52, 54 slide through the respective slots 56, 58 formed in the inner sleeve 12. When the broad tips 53, 55 of the respective locking fingers 52, 54 contact the respective ramps 56, 58, the ramps 56, 58 displace the respective locking fingers 52, 54 in a radially outward direction as the outer sleeve 14 is forced to slide forward over the inner sleeve 12. The outer sleeve 14 continues to slide over the inner sleeve 12 and the locking fingers 52, 54 continue to expand in a radially outward direction until the locking finger tips 53, 55 strike the cylindrical wall of the socket 80 and the external negative contact 18 strikes the cylindrical side wall of the socket 80 (FIG. 5). The cylindrical side wall serves as the negative input terminal of the vehicle electrical system and is insulated from the positive terminal 82 by a non-conductive member 84. At this point, the expanded locking fingers 52, 54 firmly secure the connector 10 within the socket 80.

The connector 10 is capable of accommodating cigarette lighter sockets having different diameters because the locking fingers 52, 54 expand to the necessary radial position for firmly securing the connector 10 into a socket. The maximum expansion of the locking fingers 52, 54 occurs when the outer sleeve 14 is disposed in the extreme forward position relative to the inner sleeve 12 (i.e., the stop 66 strikes the negative contact 18). In the preferred embodiment, each locking finger moves a radial distance of approximately 0.20 inches in response to movement of the outer sleeve 14 from its retracted position (FIGS. 3 and 4) to its extreme forward position. With this expansion capability, the connector 10 is capable of accommodating cigarette lighter sockets having inner diameters ranging from approximately 0.80 inches to 0.92 inches.

While the present invention has been described with reference to one or more particular embodiments, those skilled in the art will recognize that many changes may be made thereto without departing from the spirit and scope of the present invention. For example, the ramps 60, 62 formed by the bottom surface of the respective slots 56, 58 may be substituted with sharp corners so long as the broad locking finger tips 53, 55 are sufficiently curved at the distal ends thereof to prevent the tips 53, 55 from catching on those sharp corners as the outer sleeve 14 is moved toward its forward position. Furthermore, the number of locking fingers for securing the connector 10 in the cigarette lighter socket 80 may be reduced to as few as one locking finger or increased to more than two locking fingers. Each of these embodiments and obvious variations thereof is contemplated as falling within the spirit and scope of the claimed invention, which is set forth in the following claims.

What is claimed is:

1. A connector for connecting an electronic device to a vehicle electrical system, comprising:

a hollow inner sleeve forming a nozzle located at a distal end of said sleeve and opening into an interior of said inner sleeve;

a first conductive contact mounted within said nozzle;

a second conductive contact mounted to a sidewall of said inner sleeve; and a hollow outer sleeve slidably mounted over said inner sleeve and longitudinally movable relative to said inner sleeve between a forward position and a retracted position, said outer sleeve forming at least a first expandable locking finger at a distal end thereof and spaced away from said second contact, said inner sleeve forming means for displacing said first locking finger laterally outward in response to longitudinal movement of said outer sleeve from said retracted position to said forward position.

2. The connector of claim 1, wherein said first contact is slidably mounted within said nozzle and is movable between an extended position and a depressed position, said first contact protruding from said nozzle while in said extended position and said first contact being substantially disposed within said nozzle while in said depressed position, said first contact being biased toward said extended position.

3. The connector of claim 1, wherein said outer sleeve forms a second expandable locking finger at a distal end thereof and spaced away from said second contact, said inner sleeve forming a second ramp for displacing said second locking finger laterally outward in response to movement of said outer sleeve from said retracted position to said forward position.

4. The connector of claim 3, wherein said first locking finger, said second locking finger, and said second contact are spaced away from one another.

5. The connector of claim 1, wherein said inner sleeve includes a generally cylindrical distal portion and a generally elliptical proximal portion, said cylindrical portion forming said nozzle at the distal end thereof.

6. The connector of claim 5, wherein said outer sleeve includes a generally cylindrical distal portion and a generally elliptical proximal portion, said cylindrical portion of said outer sleeve being substantially disposed over said cylindrical portion of said inner sleeve and said elliptical portion of said outer sleeve being substantially disposed over said cylindrical portion of said inner sleeve.

7. The connector of claim 6, wherein said cylindrical portion of said outer sleeve forms said first locking finger at the distal end thereof.

8. The connector of claim 1, wherein said first locking finger includes a broad tip and said inner sleeve forms a guide slot receiving said broad tip.

9. The connector of claim 8, wherein a proximal portion of said slot opens into the interior of said inner sleeve and said broad tip protrudes through said proximal portion into the interior of said inner sleeve while said outer sleeve is in said retracted position.

10. The connector of claim 9, wherein said means for displacing said first locking finger includes a ramp formed by a distal portion of said slot, said broad tip contacting said ramp and being displaced laterally outward in response to longitudinal movement of said outer sleeve from said retracted position to said forward position.

11. The connector of claim 1, wherein said means for displacing said first locking finger includes a ramp formed by said inner sleeve.

12. A connector for connecting an electronic device to a vehicle electrical system, comprising:

a hollow inner sleeve forming a nozzle located at a distal end of said sleeve and opening into an interior of said inner sleeve;

a first conductive contact slidably mounted to said nozzle and movable between an extended position and a depressed position, said first contact protruding from said nozzle while in said extended position and said first contact being substantially disposed within said nozzle while in said depressed position, said first contact being biased toward said extended position;

a second conductive contact mounted to a sidewall of said inner sleeve; and a hollow outer sleeve slidably mounted over said inner sleeve and longitudinally movable relative to said inner sleeve between a forward position and a retracted position, said outer sleeve forming a pair of spaced expandable locking fingers at a distal end thereof and spaced away from said second contact, said inner sleeve forming means for displacing said respective locking fingers laterally outward in response to longitudinal movement of said outer sleeve from said retracted position to said forward position.

13. A method of manufacturing a connector for connecting an electronic device to a vehicle electrical system, said method comprising the steps of:

forming a hollow inner sleeve with a displacing surface and with a nozzle located at a distal end of said sleeve and opening into an interior of said inner sleeve;

mounting a first conductive contact within said nozzle;

forming a hollow outer sleeve with at least one expandable locking finger at a distal end thereof;

slidably mounting said outer sleeve over said inner sleeve so that said outer sleeve is longitudinally movable relative to said inner sleeve between a forward position and a retracted position, said displacing surface of said inner sleeve displacing said first locking finger laterally outward in response to longitudinal movement of said outer sleeve from said retracted position to said forward position; and mounting a second conductive contact to a sidewall of said inner sleeve, said second contact being spaced away from said locking finger.

* * * * *